(12) United States Patent
Jepsen

(10) Patent No.: US 9,541,126 B2
(45) Date of Patent: Jan. 10, 2017

(54) LARGE ROLLING BEARING

(75) Inventor: Torsten Jepsen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 616 days.

(21) Appl. No.: 14/122,988

(22) PCT Filed: May 21, 2012

(86) PCT No.: PCT/EP2012/059342
§ 371 (c)(1),
(2), (4) Date: Mar. 5, 2014

(87) PCT Pub. No.: WO2012/163707
PCT Pub. Date: Dec. 6, 2012

(65) Prior Publication Data
US 2014/0199171 A1 Jul. 17, 2014

(30) Foreign Application Priority Data

Jun. 1, 2011 (DE) .................. 10 2011 076 872

(51) Int. Cl.
*F03D 80/70* (2016.01)
*F16C 19/08* (2006.01)
(Continued)

(52) U.S. Cl.
CPC ............... *F16C 19/08* (2013.01); *F03D 80/70* (2016.05); *F16C 19/181* (2013.01);
(Continued)

(58) Field of Classification Search
CPC .. F04D 25/062; F04D 29/046; F04D 29/0462; F04D 29/0467; F04D 29/049; F16C 19/08; F16C 19/166; F16C 19/183; F16C 19/541;F16C 19/546; F16C 33/58; F16C 33/583; F16C 33/60; F16C 2360/14; F16C 2360/23; F16C 2360/24; F16C 2360/31; F03D 80/00; F03D 80/70
(Continued)

(56) References Cited

U.S. PATENT DOCUMENTS 3,309,157 A   3/1967 Schlueter
6,015,264 A * 1/2000 Violette .................. B64C 11/06
                                                          384/517

(Continued)

FOREIGN PATENT DOCUMENTS

DE            1855303 U        7/1962
DE    10 2004 023 774 A1      12/2005
(Continued)

*Primary Examiner* — Matthew W Jellett
(74) *Attorney, Agent, or Firm* — Seed Intellectual Property Law Group LLP

(57) ABSTRACT

The invention concerns a large-size rolling bearing which is in the form of a multi-row ball-bearing rotary joint for carrying axial loads, radial loads and tilting moments. The large-size rolling bearing has an outer race, an inner race, a first ball row and a second ball row. The first ball row and the second ball row are respectively arranged in axially mutually spaced relationship in a four-point bearing configuration, associated with the first ball row are four raceway portions and associated with the second ball row are four raceway portions. The invention concerns in particular a large-size rolling bearing in which a surface of a respective raceway portion provided in the inner race is larger than the surface of the respectively adjacent raceway portion provided in the inner race and equal to the surface of the respectively diametrally oppositely disposed raceway portion provided in the outer race.

20 Claims, 4 Drawing Sheets

(51) Int. Cl.
  *F16C 33/58* (2006.01)
  *F16C 19/18* (2006.01)
  *F16C 33/60* (2006.01)
(52) U.S. Cl.
  CPC ............ *F16C 33/583* (2013.01); *F16C 33/60* (2013.01); *F16C 2300/14* (2013.01)
(58) Field of Classification Search
  USPC ........ 416/174; 384/504, 507, 512, 513, 515, 384/516
  See application file for complete search history.

(56) References Cited

U.S. PATENT DOCUMENTS

| | | | | |
|---|---|---|---|---|
| 6,827,496 | B2 * | 12/2004 | Iwata | F16C 19/166 384/516 |
| 6,837,623 | B2 * | 1/2005 | Shirokoshi | F16C 19/166 29/898.06 |
| 8,613,557 | B2 * | 12/2013 | Gruber | F16C 19/181 277/566 |
| 8,944,692 | B2 * | 2/2015 | Hori | F03D 7/0204 384/507 |
| 2006/0078715 | A1 | 4/2006 | Lu | |
| 2011/0085756 | A1 | 4/2011 | Hori et al. | |
| 2012/0068035 | A1 | 3/2012 | Iguchi | |

FOREIGN PATENT DOCUMENTS

| | | | |
|---|---|---|---|
| DE | 10 2004 021 054 A1 | 4/2006 | |
| DE | 20 2006 007 434 U1 | 11/2006 | |
| DE | 10 2006 003 156 A1 | 7/2007 | |
| DE | 10 2006 031 956 A1 | 1/2008 | |
| DE | 10 2008 049 813 A1 | 4/2010 | |
| EP | 2 290 249 B1 | 11/2011 | |
| EP | 2 503 168 A1 | 9/2012 | |
| JP | 2009047206 A | 3/2009 | |
| JP | 2010-2011 A | 1/2010 | |
| RU | 2 095 650 C1 | 11/1997 | |
| TW | I246175 B | 10/1993 | |
| TW | 201104091 A1 | 2/2011 | |
| WO | WO 2011013536 A1 * | 2/2011 | ........... F03D 7/0204 |
| WO | 2011/062269 A1 | 5/2011 | |

* cited by examiner

LARGE ROLLING BEARING

BACKGROUND

Technical Field

The present invention concerns a large-size rolling bearing.

Description of the Related Art

Large-size rolling bearings are used in machine and plant production for providing a rotary connection in relation to high loads. The term large-size rolling bearings is used in particular in relation to running circle diameters of 300 mm and larger. Depending on the respective installation condition and in dependence on the forces to be carried, the running circle diameters of the large-size rolling bearings are certainly also several 1000 mm. In the case of bearings of that order of magnitude the large-size rolling bearings themselves are of a considerable inherent weight and require considerable fitment complication and expenditure.

With that background in mind it is desired to use integrated bearings which have a single unit which can be fitted in place and which are adapted to carry axial forces, radial forces and possibly tilting moments. For that reason rolling bearings of a multi-row structural configuration are primarily used, if there is a requirement to carry axial forces, radial forces and tilting moments. Inter alia the use of multi-row four-point bearings is known.

In terms of selecting the correct bearing, designers are faced with the conflicting aims of providing a bearing providing the highest possible load-bearing capability while involving a very small installation space and with the lowest possible complication and expenditure in placing it therein. In situations where, due to the structure involved, it is necessary to observe a predetermined limited structural space, or in (rare) cases involving retro-fitment of large-size rolling bearings in an existing environment with the aim of retro-fitting a bearing enjoying a higher load-bearing capability (in comparison with the one which was previously fitted there), there is the problem that higher stability with known bearing types is not readily achieved without affording a larger structural space in the axial or radial direction, that being linked to a high constructional burden.

The current state of the art attention is directed at this point generally to the following documents: DE 10 2008 049 813 A1, DE 10 2004 023 774 A1, DE 10 2004 051 054 A1, DD 46 126A5, DE 18 55 303 U and DE 10 2006 031 956 A1.

BRIEF SUMMARY

One or more embodiments are directed to a large size rolling bearing, such as those defined above, which is in the form of a multi-row ball-bearing rotary joint for carrying axial loads, radial loads and tilting moments, comprising an outer race, an inner race, a first ball row and a second ball row, wherein the first ball row and the second ball row are respectively arranged in axially mutually spaced relationship in a four-point bearing configuration, wherein associated with the first ball row are four raceway portions and associated with the second ball row are four raceway portions which respectively have a surface for receiving the ball raceway. The large-size rolling bearing may provide improved load-bearing capability and allow for small installation dimensions.

In one embodiment the large-size rolling bearing includes a surface of a respective raceway portion provided in the inner race is larger than a surface of the respectively adjacent raceway portion provided in the inner race and equal to the surface of the respectively diametrally oppositely disposed raceway portion provided in the outer race. One or more embodiments of the invention are based on the realization that the ball row of a four-point bearing has in total four contact points with respectively separate surface portions in the inner and outer races. Those contact points are not constantly at the same location—in relation to the cross-section of the bearing—but alter in dependence on the load situation. That also applies for the situation involving load reversal. The greater the force acting on the bearing in the axial direction, the correspondingly greater is the contact point displaced in the loaded raceway portions in the direction of the bearing gap between the inner race and the outer race. That is due to the fact that the balls and raceway surfaces, as a result of the axial force occurring, are exposed to a deformation and respectively make surface contact with the raceway portion. To be able to achieve a certain running tolerance, in the case of four-point bearings the radius of curvature of the balls is slightly less than the radius of curvature of the corresponding raceway portions (in cross-section). That means that, when high axial forces occur, the inner race and the outer race experience a force acting thereon, which urges them apart, whereby the contact region between the respective balls and the corresponding loaded raceway surface can move. Those surfaces of the raceway portions, which are loaded more heavily upon a preferential loading on the large-size rolling bearing, are increased in size. Irrespective of whether the load is a load resting thereon or a lifting load, the bearing is to be designed so that the respective surfaces of the raceway portions that are more heavily loaded in the preferential direction are increased in size.

As each raceway portion in the bearing is finite, upon the attainment of a critical axial load is point is reached at which the contact region between the ball and the raceway surface (in the sense of: surface available for the raceway) travels to the edge of the raceway surface or therebeyond. As a consequence of that, both the balls and also the edges of the raceway portions are exposed to severe wear.

Based on those realizations, the one or more embodiments of the invention makes use of the fact that, in the design of the bearing arrangement, the direction—considered axially—in which the load on the bearing will be greater is already known. The bearing can therefore be specifically adapted to carry higher loadings from one axial direction than from the other. Because two diagonally opposite raceway portions are loaded more greatly than the respective other oppositely disposed raceway portions by virtue of the axial load, one or more embodiments makes use of knowledge of the displacement of the contact region within the raceway surfaces, insofar as the surfaces which are expected to be loaded more greatly are increased in size in comparison with the surfaces which are expected to be loaded to a lesser extent. The additional structural space which is required as a consequence of an increase in size of a surface can be compensated in that way in that the respectively corresponding surface which is subjected to a lesser load is reduced in accordance with the increase in size of the one surface.

In one embodiment, the surface of the raceway portion provided in the inner race is equal to the surface of the respectively diametrally opposite raceway portion provided in the outer race.

Further preferably the respectively larger surfaces of the raceway portions are of equal size. In the present case surfaces of equal size means that, having regard to tolerances resulting from production engineering, the length of a raceway surface should not alter in cross-section by more than +/−3%.

When hereinbefore or hereinafter reference is made to surfaces, that generally means the cross-sectional surface area and not the actual peripherally extending surface.

In a preferred embodiment the inner race for the first ball row has an annular first inner shoulder and an annular second inner shoulder which respectively delimit one of the surfaces for receiving a ball raceway of the first ball row. In addition the inner race for the second ball row has an annular third inner shoulder and an annular fourth inner shoulder which respectively delimit one of the surfaces for receiving the ball raceway of the second ball row, wherein a maximum diameter of the fourth inner shoulder is different from a maximum diameter of the first inner shoulder. The increase in diameter of the inner shoulders in the aforementioned manner permits an increase in surface area in a fashion which can be calculated and predicted in geometrically simple fashion, without the geometry of the bearing overall having to be completely re-designed.

In a preferred embodiment the maximum diameter of the third inner shoulder is different from the maximum diameter of the second inner shoulder.

Preferably the outer race for the first ball row has a first annular outer shoulder and a second annular outer shoulder which respectively delimit one of the surfaces for receiving the ball raceways of the first ball row. The outer race for the second ball row also has a third annular outer shoulder and a fourth annular outer shoulder which respectively delimit one of the surfaces for receiving the ball raceways of the second ball row, wherein the minimum diameter of the fourth outer shoulder is different from the minimum diameter of the first outer shoulder. The outer race and the raceway portions provided in the outer race are preferably of a configuration corresponding to the respective portions of the inner race in order to compensate equally for a symmetrically occurring displacement of the contact region between the balls and the surfaces of the raceway portions both in the inner race and also in the outer race.

Preferably the minimum diameter of the third outer shoulder is different from the minimum diameter of the second outer shoulder.

In another particularly preferred embodiment of the invention the largest of the maximum diameters of the inner shoulders is smaller than or equal to the smallest of the minimum diameters of the outer shoulders. That embodiment has the additional advantage that, in spite of an increase in size according to the invention of the surfaces of the raceway portions, that are to be expected to be loaded more heavily, the inner race can still be passed completely through the outer race, whereby assembly and dismantling of the bearing is considerably simplified.

In a preferred embodiment the balls of the first ball row are arranged together with the balls of the second ball row along a first running circle diameter.

Preferably the largest of the maximum diameters of the inner shoulders and/or the smallest of the minimum diameters of the outer shoulders is equal to or in a range of up to 0.5 mm below the first running circle diameter of the first and second ball rows.

Further preferably the smallest of the minimum diameters of the outer shoulders is equal to or in a range of up to 0.5 mm above the first running circle diameter of the first and second ball rows.

In an advantageous development of this embodiment the maximum diameter of the first inner shoulder is equal to the maximum diameter of the third inner shoulder and larger than the maximum diameter respectively of the second and fourth inner shoulders.

Further preferably the minimum diameter of the second outer shoulder is equal to the minimum diameter of the fourth outer shoulder and smaller than the minimum diameter respectively of the first and third outer shoulders.

In an alternative embodiment the balls of the first ball row are arranged along the first running circle diameter and the balls of the second ball row are arranged along a second running circle diameter which is different from the diameter of the first ball row. That gives the advantage that the possible pressure angle, that is to say the possible displacement of the contact points in the direction of the gap between the inner and outer races of the bearing, can be altered to a substantially greater degree than would be the case if the balls of all rows were arranged on the same running circle diameter. The extent of the increase occurs in dependence on the size of the displacement between the first running circle diameter and the second running circle diameter.

In this alternative embodiment preferably the maximum diameter of the first inner shoulder is larger than the maximum diameter of the second inner shoulder and the maximum diameter of the third inner shoulder is larger than the maximum diameter of the fourth inner shoulder.

Further preferably the minimum diameter of the fourth outer shoulder is smaller than the minimum diameter of the third outer shoulder and the minimum diameter of the second outer shoulder is smaller than the minimum diameter of the first outer shoulder.

In a further preferred embodiment the first ball row comprises balls of a first ball diameter and the second ball row comprises balls of a second ball diameter different from the first ball diameter.

In a further preferred embodiment the large-size rolling bearing has one or more further ball rows. The one or more further ball rows are preferably of a configuration corresponding to the first ball row and/or the second ball row in accordance with the above-described preferred embodiments. That concerns in particular the configuration of oppositely disposed shoulders, raceway portions, ball diameters and/or running circle diameters. In a particularly preferred embodiment the large-size rolling bearing has a third ball row.

The invention further concerns a wind power installation comprising a pylon having a pylon head, and a pod adapted to receive a rotor, wherein the pod is mounted rotatably relative to the pylon by means of an azimuth bearing. According to various embodiments of the invention the aforementioned wind power installation is improved in that the azimuth bearing is in the form of a large-size rolling bearing according to one of the above-described preferred embodiments.

BRIEF DESCRIPTION OF THE SEVERAL VIEWS OF THE DRAWINGS

The invention is described in greater detail hereinafter by means of two preferred embodiments by way of example and with reference to the accompanying Figures in which.

DETAILED DESCRIPTION

The Figures described in greater detail hereinafter illustrate the invention on the basis of a load situation by way of example. That load situation represents a load resting on the bearing, which acts from above on the inner race of the respectively illustrated bearing in a direction which is vertical—in relation to FIGS. 1 to 6. It will be apparent that the corresponding configuration and numbering of the shoulders and ball rows can be reversed in dependence on the load situation having regard to the orientation of the bearings in the Figures, to illustrate a respectively different load situation.

Figure 1:
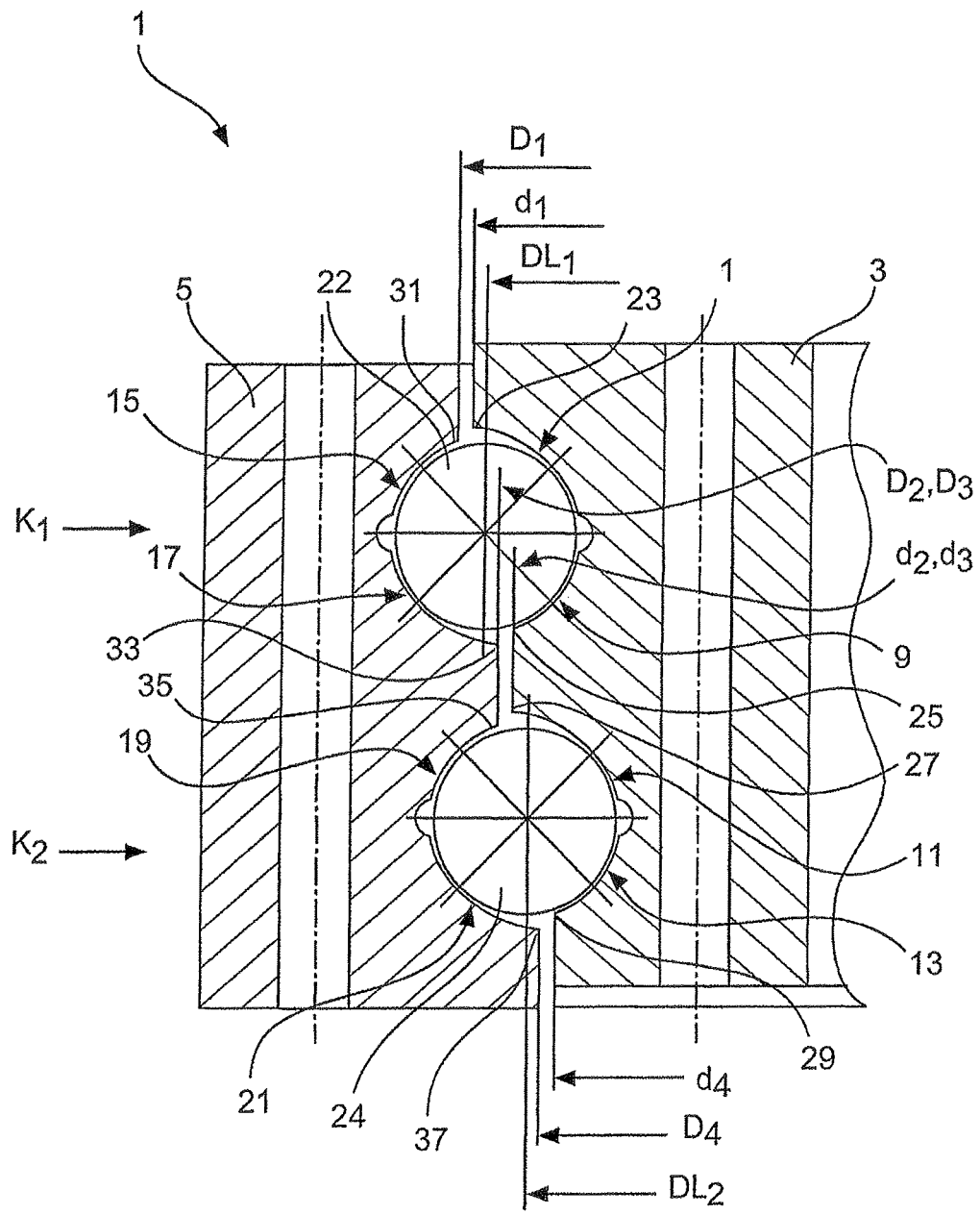
FIG. 1 shows a detail view of a large-size rolling bearing according to a first embodiment of the invention.

FIG. 1 shows a cross-sectional view in detail through a large-size rolling bearing according to the invention in accordance with a first embodiment of the invention. The large-size rolling bearing 1 has an inner race 3 and outer race 5. The large-size rolling bearing 1 shown in FIG. 1 is a two-row large-size rolling bearing having a first ball row K1 and a second ball row K2. The second ball row K2 is axially spaced from the first ball row K1. The first ball row K1 includes a multiplicity of balls 22 arranged along a first running circle diameter DL1. The second ball row K2 includes a multiplicity of balls 24 arranged along a second running circle diameter DL2.

The inner race 3 has a first raceway portion 7 and a second raceway portion 9 which are associated with the first ball row K1. In addition the inner race 3 has a third raceway portion 11 and a fourth raceway portion 13 which are associated with the second ball row K2. The first raceway portion 7 and the second raceway portion 9 are arranged in mutually adjacent relationship and separated from each other by a peripherally extending annular groove. The first raceway portion 7 is delimited by an annular first inner shoulder 23. The second raceway portion 9 is delimited by an annular second inner shoulder 25. The first inner shoulder 23 is of a maximum diameter d1. The second inner shoulder 25 is of a second maximum diameter d2. In this case the maximum diameter d1 of the first inner shoulder 23 is greater than the maximum diameter d2 of the second inner shoulder 25.

The third raceway portion 11 and the fourth raceway portion 13 are arranged adjacent to each other in the inner race 3 and separated from each other by a peripherally extending annular groove. The third raceway portion 11 is delimited by an annular third inner shoulder 27. The fourth raceway portion 13 is delimited by an annular fourth inner shoulder 29. The third inner shoulder 27 is of a maximum diameter d3. In the FIG. 1 embodiment the maximum diameter d3 of the third inner shoulder 27 corresponds to the maximum diameter d2 of the second inner shoulder 25. The fourth inner shoulder 29 is of a maximum diameter d4. In the FIG. 1 embodiment the maximum diameter d3 of the third inner shoulder 27 is larger than the maximum diameter d4 of the fourth inner shoulder 29.

Provided in the outer race 5 are outer shoulders which correspond to the inner shoulders of the inner race 3 and which respectively delimit a raceway portion also provided in the outer race 5. The outer race 5 has in particular a first raceway portion 15 and a second raceway portion 17 which are associated with the first ball row K1. In addition the outer race 5 has a third raceway portion 19 and a fourth raceway portion 21 which are associated with the second ball row K2. The first raceway portion 15 in the outer race 5 is of a configuration corresponding to the second raceway portion 9 of the inner race 3, that is diametrally opposite—with respect to the balls 22. The second raceway portion 17 in the outer race 5 is of a configuration corresponding to the first raceway portion 7 of the inner race 3, that is diametrally opposite—with respect to the balls 22.

The third raceway portion 19 in the outer race 5 is of a configuration corresponding to the fourth raceway portion 13 of the inner race 3—with respect to the balls 24. The fourth raceway portion 21 in the outer race 5 is of a configuration corresponding to the third raceway portion 11 of the inner race 3, that is diametrally opposite—with respect to the balls 24.

The first raceway portion 15 is delimited by a first annular outer shoulder 31 which is of a minimum diameter D1. The second raceway portion 17 is delimited by a second annular outer shoulder 33 which is of a minimum diameter D2. The third raceway portion 19 is delimited by a third annular outer shoulder 35 which is of a minimum diameter D3. The fourth raceway portion 21 is delimited by a fourth annular outer shoulder 37 which is of a minimum diameter D4.

The balls 22 of the first ball row K1 are arranged along a first running circle diameter DL1. The balls 24 of the second ball row K2 are arranged along a second running circle diameter DL2. As shown in FIG. 1 DL1 is larger than DL2.

The surface of the first raceway portion 7 of the inner race 3 is increased in size by the diameter d1 of the first inner shoulder 23 being larger than the diameter d2 of the second inner shoulder 25.

As shown in FIG. 1 d1 is also larger than DL1. The surface of the second raceway portion 17 of the outer race is increased in size in a manner corresponding to the surface of the first raceway portion 7 of the inner race 3 by the diameter D2 being less than the diameter D1 of the first outer shoulder 31. The diameter D2 of the second outer shoulder 33 is smaller than the first running circle diameter DL1 by the same amount as the diameter d1 of the first inner shoulder 23 is larger than DL1.

The raceway portions of the second ball row K2 are also of a configuration similar to the first ball row K1. The third raceway portion 11 has an enlarged surface which is precisely as large as the surface of the fourth raceway portion 21 of the outer race 5. The diameter d3 of the third inner shoulder 27 is larger than the running circle diameter DL2 of the second ball row K2 by the same amount as the diameter D4 of the fourth outer shoulder 37 of the fourth raceway portion 21 of the outer race 5 is smaller than the second running circle diameter DL2. The raceway portions 13 and 19 of the inner race 3 and the outer race 5 respectively, which are in diametrally opposite relationship with respect to the balls 24, are reduced in size in the same manner relative to the raceway portions 11 and 21 as was already described hereinbefore in relation to the first ball row K1 and the raceway portions 9 and 15.

Figure 2:
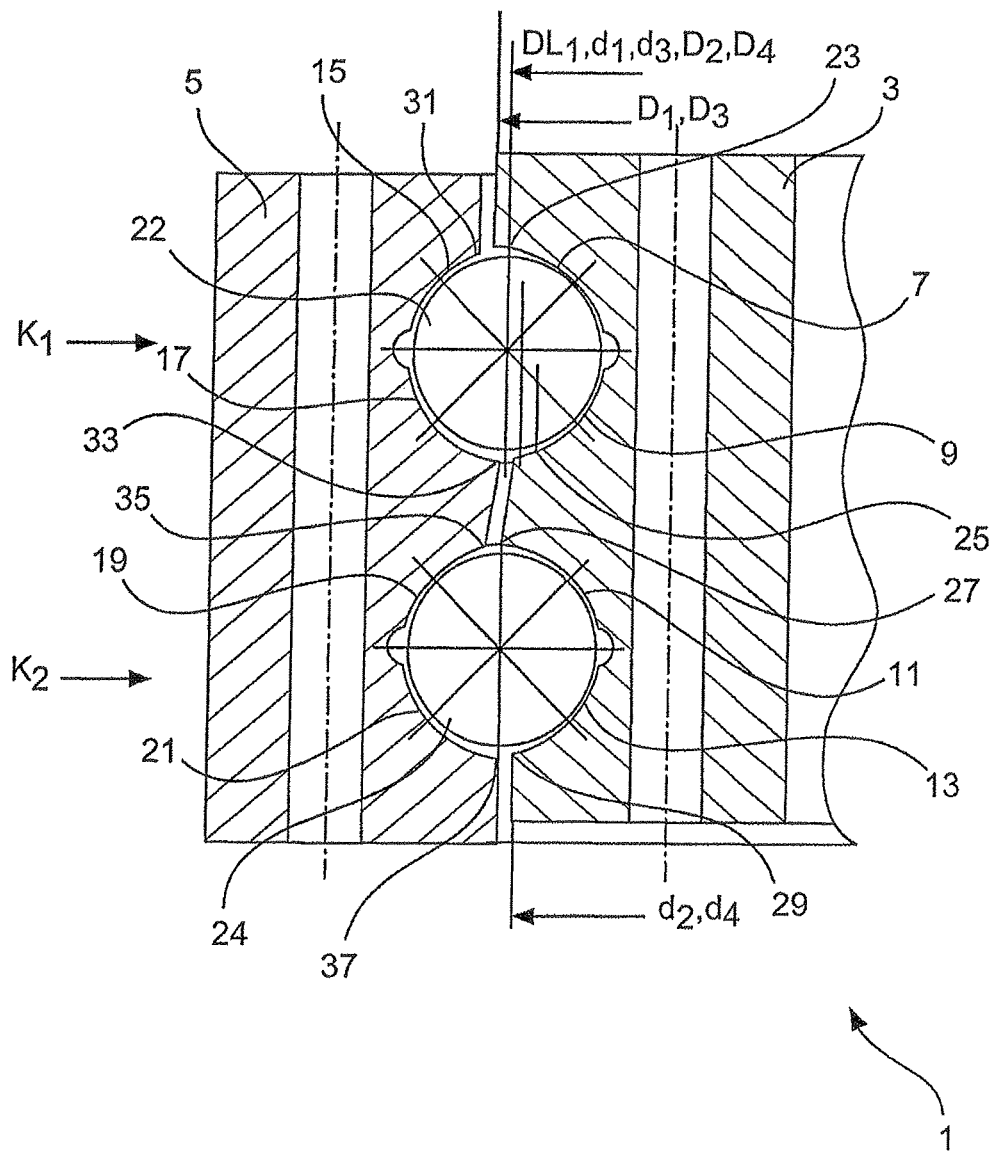
FIG. 2 shows a detail view of a large-size rolling bearing according to a second embodiment of the invention.

FIG. 2 shows a large-size rolling bearing 1 of the present invention in accordance with a second embodiment. The large-size rolling bearing 1 in FIG. 2 is similar in structure to the large-size rolling bearing 1 in FIG. 1 in regard to the arrangement of the first ball row K1 and the second ball row K2. In regard to the inner shoulders, the raceway portions delimited thereby, the outer shoulders and the raceway portions delimited thereby, attention is directed in this respect to the description relating to FIG. 1, insofar as identical references have been allocated.

It will be noted however that the embodiments of FIGS. 1 and 2 differ in regard to the dimensioning of the shoulders. The inner race 3 of FIG. 2 is in particular of the configuration as follows:

The first inner shoulder 23 of the inner race 3 is of a maximum diameter d1 equal to the running circle diameter DL1 of the first ball row K1. In contrast the minimum diameter D1 of the first outer shoulder 31 of the outer race 5 is larger than the running circle diameter DL1 of the first ball row K1. The second inner shoulder 25 of the inner race 3 is of a maximum diameter d2 which is smaller than the running circle diameter DL1 of the first ball row K1. The corresponding minimum diameter D2 in the outer race 5 of the second outer shoulder 33 is of a minimum diameter D2 which is equal to the running circle diameter DL1 of the first ball row K1.

The maximum diameter d3 of the third inner shoulder 27 in the inner race 3 is equal to the maximum diameter d1 of the first inner shoulder 23 of the first ball row K1. In the FIG. 2 embodiment the running circle diameter DL1 of the first ball row K1 also corresponds to the running circle diameter of the second ball row K2. Unlike FIG. 1 therefore the two ball rows K1 and K2 are arranged on an identical running circle diameter DL1 and are axially spaced relative to each other. The minimum diameter D3 of the third outer shoulder 35 in the outer race 5 is in turn larger than the running circle diameter DL1. D3 is equal to D1.

The maximum diameter d4 of the fourth inner shoulder 29 of the inner race 3 is equal to the diameter d2 of the second inner shoulder 25. The corresponding minimum diameter D4 of the fourth outer shoulder 37 of the outer race 5 is equal to the minimum diameter D2 of the second outer shoulder 33.

In the FIG. 2 embodiment the running circle diameter DL1 serves as a reference value. Provided between the outer race and the inner race is a respective gap which varies by the same amount in the direction of the outer race or inner race, whereby raceway portions which are uniformly increased and reduced in size and which are in mutually diametrally opposite relationship (with respect to the respective ball row K1, K2) are afforded. At the same time, after removal of the balls 22, 24 or prior to introduction of the balls 22, 24, the inner race 3 can be fitted completely through the outer race 5 because there is no overlap.

Figure 3:
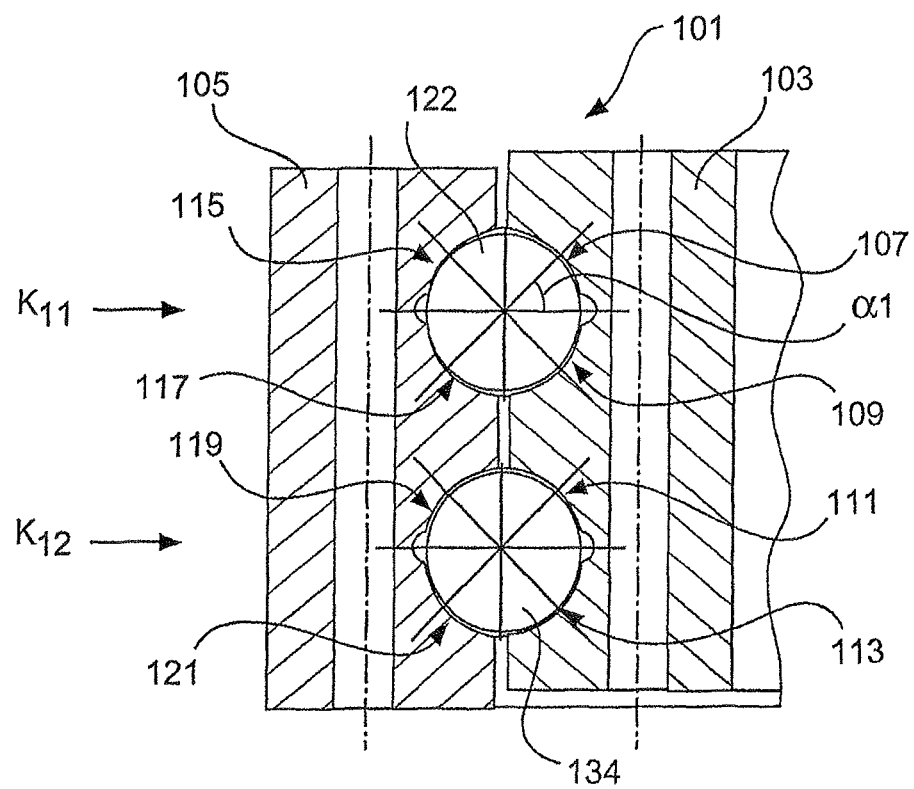
FIG. 3 shows a large-size rolling bearing from the state of the art in a first condition.
Figure 4:
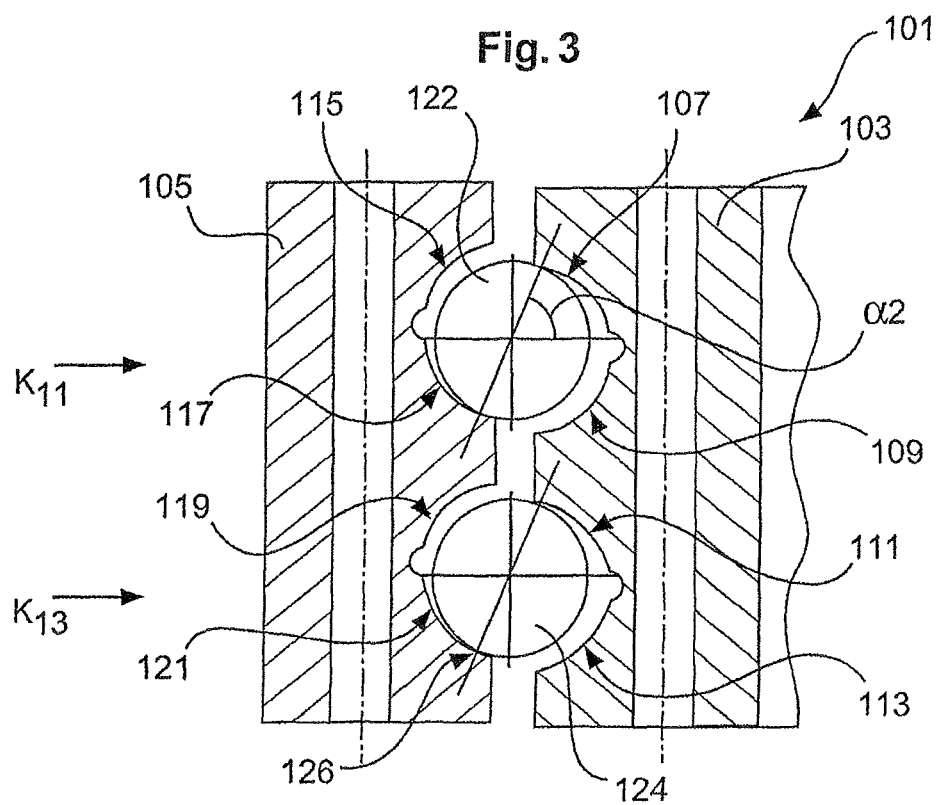
FIG. 4 shows the large-size rolling bearing of FIG. 3 in a second condition.

The mode of operation of a large-size rolling bearing 1 according to the invention is now to be illustrated with reference to FIGS. 3 to 6, in comparison with a large-size rolling bearing 101 from the state of the art. FIGS. 3 and 4 firstly show a large-size rolling bearing 101 from the state of the art. The large-size rolling bearing 101 has an inner race 103 and an outer race 105. Two ball rows K11 and K12 are arranged between the inner race 103 and the outer race 105. The large-size rolling bearing 101 from the state of the art is a two-row four-point bearing. The balls of the first ball row K11 have two respective contact points with the inner race 103 and the outer race 105. The contact points are respectively arranged in a separate raceway portion 107, 109, 115 and 117. A pressure angle α1 is formed relative to a radial axis. The same applies to the second ball row K12 as to the first ball row K11, in relation to the raceway portions 111, 113, 119 and 121. The surfaces of the raceway portions 107, 109, 111, 113, 115, 117, 119 and 121 are respectively of substantially equal size.

FIG. 4 shows the bearing of FIG. 3 when a high axial load resting thereon is applied by way of the inner race and acts on the bearing. The inner race 103 is urged downwardly in relation to the outer race 105. The inner race 103 and the outer race 105 are driven away from each other, which is shown on an exaggerated scale in FIG. 4, by virtue of the balls of the first ball row K11 and the second ball row K12 engaging against the surfaces of the raceway portions. As a consequence of that relative movement between the inner race and the outer race and additional deformation of the balls 122, 124, there is an increase in the pressure angle α which now assumes the value α2. By virtue of the deformation of the balls and the raceway surfaces, the point contact of a ball with the surface of the raceway portion, that is in contact with the ball, is increased to afford a surface, this being indicated in relation to the second ball row K12 by the ellipse 126. In the view shown in FIG. 4 that deformation region is in the region of an edge which delimits the raceway portion 121. The same phenomenon is also seen by virtue of the symmetrical configuration of the bearing in relation to the other, heavily loaded raceway portions 111, 107 and 117. Severe wear occurs, both on the part of the balls and also on the part of the raceway portions.

Figure 5:
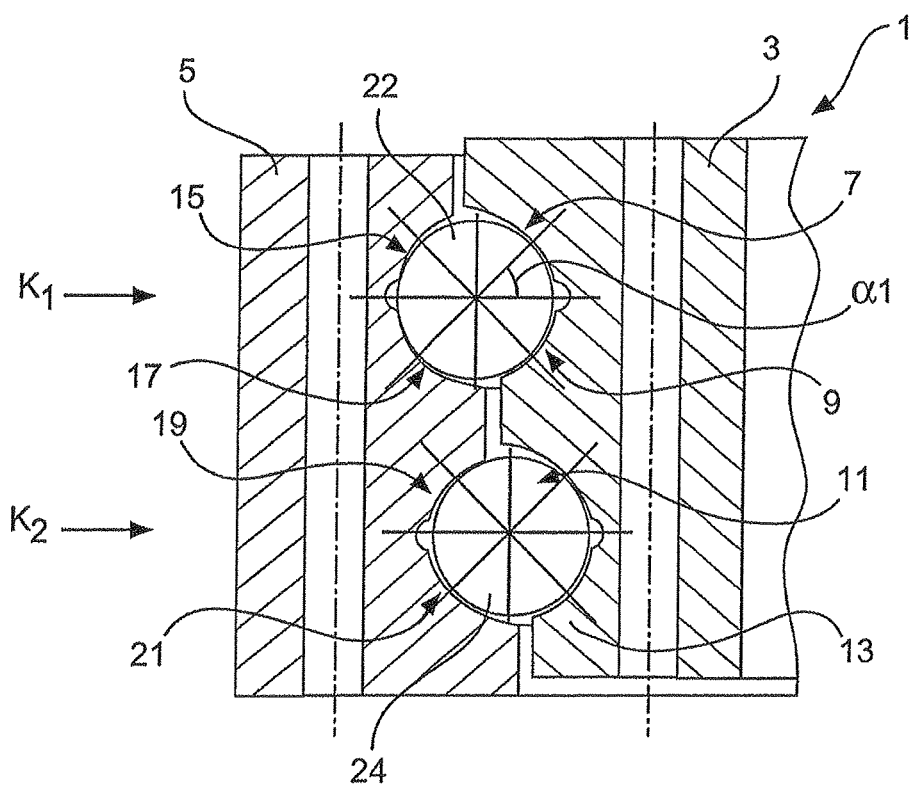
FIG. 5 shows a detail view of the large-size rolling bearing of the first embodiment in a first condition, similarly to FIG. 3.
Figure 6:
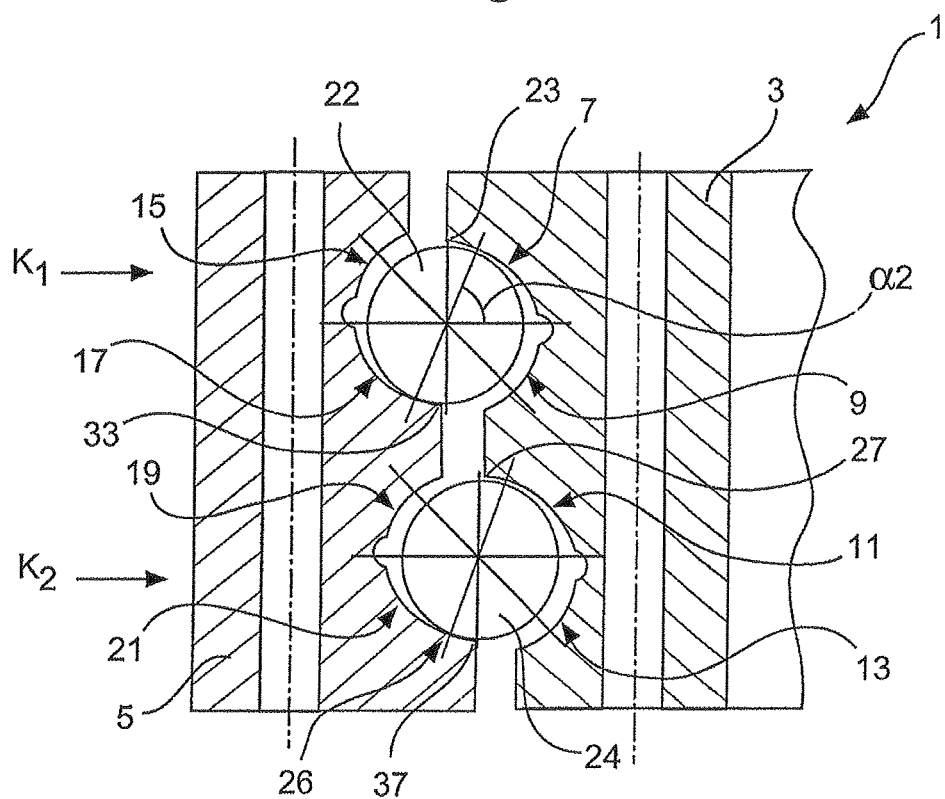
FIG. 6 shows a detail view of the large-size rolling bearing of the first embodiment of the invention in a second condition, similarly to FIG. 4.

To distinguish from FIGS. 3 and 4, FIGS. 5 and 6 show the improved function of the large-size rolling bearing according to the present invention. The mode of operation shown in FIGS. 5 and 6 applies for both embodiments of the present invention, but for the sake of simplicity reference is only made to the first embodiment of the invention which has also already been described and shown in FIG. 1. FIG. 5 shows the large-size rolling bearing of FIG. 1 in a substantially unloaded condition. The contacting points of the balls 22, 24 of the first and second ball rows K1, K2 are oriented substantially at an angle of α1 relative to the radial direction of the bearing with respect to the center point of the balls. In the condition shown in FIG. 6 an axial load is applying a load to the inner race and acts downwardly in the illustrated orientation in FIG. 6. By virtue of the engagement of the balls 22, 24 of the first ball row K1 and the second ball row K2 against the surfaces of the raceway portions the inner race 3 and the outer race 5 are urged away from each other. Consequently the contact of the balls 22, 24 with the respective raceway portions is displaced. A contact surface which is formed by virtue of the deformation of the balls and the raceway surfaces, illustrated by the ellipse 26, is displaced in the direction of the inner shoulders 23, 27 of the inner race 3 and the outer shoulders 33, 37 of the outer race 5. The surface of the raceway portions 9, 15 of the first ball row K1 and the surface of the raceway portions 13, 19 of the second ball row K2 are substantially unloaded but at any event are loaded markedly less heavily than the above-mentioned surfaces of the raceway portions 7, 11, 17, 21. It will be noted however that the ellipse 26 is not disposed in the region of the annular shoulders 23, 33, 27, 37, by virtue of the surface, that is increased in size according to the invention, of the raceway portions 7, 17, 11 and 21, in spite of the heavy axial load. Consequently no wear of the balls and/or raceway portions of the inner race 3 and outer race 5 occurs. In the case of a similar load situation and a similar pressure angle displacement as in the case of bearings known from the state of the art (see FIGS. 3 and 4), the bearing according to the invention still does not attain a critical operating condition.

The present information relating to preferred embodiments and the present specific description refer to two-row bearings. In addition however the invention also concerns further multi-row embodiments of the large-size rolling bearing according to the present invention. In particular the invention concerns a three-row large-size rolling bearing which has a third ball row. The third ball row is disposed between the inner race and the outer race in a four-point bearing configuration, wherein the third ball row is axially spaced relative to the first ball row and the second ball row, wherein associated with the third ball row are four raceway portions which each have a surface for receiving the ball raceway and wherein the surface of a respective raceway portion of the third ball row, that is provided in the inner race, is larger than the surface of the respectively adjacent raceway portion of the third ball row, that is provided in the inner race, and is equal to the surface of the respectively diametrally opposite raceway portion of the third ball row, that is provided in the outer race.

Preferred embodiments which were described hereinbefore with reference to two-row configurations of the large-size rolling bearing are also to be transferred in a similar manner to the three-row configuration of the large-size rolling bearing.

Preferred embodiments of the present invention are preferably adapted to different sectors of use by means of further structural details. Thus the large-size rolling bearings according to the invention can have for example an internal tooth arrangement, an external tooth arrangement, or no tooth arrangement at all. The large-size rolling bearings can have axially extending fixing bores passing therethrough or other flange-like or radial fixing bores. In addition the bearings according to the invention preferably have spacers between the balls, or cages for holding the balls. In further preferred embodiments the large-size rolling bearings according to the invention have lubricating bores for introducing and expelling lubricants or for example openings for introducing or removing the balls from the ball rows.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A large-size rolling bearing comprising:
an outer race;
an inner race; and
a first ball row and a second ball row, wherein the first ball row and the second ball row are respectively arranged in axially mutually spaced relationship in a four-point bearing configuration, wherein associated with the first ball row are two first raceway portions of the inner race and two first raceway portions of the outer race, and associated with the second ball row are two second raceway portions of the inner race and two second raceway portions of the outer race,
wherein an inner surface of one of the first raceway portions and one of the second raceway portions of the inner race is larger than an inner surface of another one of the first raceway portions and another one of the second raceway portions, respectively, of the inner race and is equal to an inner surface of a diametrically opposed raceway portion of the outer race.

2. The large-size rolling bearing according to claim 1 wherein a surface of the first raceway portions of the inner race is equal to a surface of the respectively diametrally opposed second raceway portion of the outer race.

3. The large-size rolling bearing according to claim 1 wherein the inner race of the first ball row has an annular first inner shoulder and an annular second inner shoulder that respectively delimit one of the inner surfaces for receiving the ball raceway of the first ball row, and the inner race of the second ball row has an annular third inner shoulder and an annular fourth inner shoulder that respectively delimit one of the inner surfaces for receiving the ball raceway of the second ball row, wherein a maximum diameter of the fourth inner shoulder is different from a maximum diameter of the first inner shoulder.

4. The large-size rolling bearing according to claim 3 wherein the maximum diameter of the third inner shoulder is different from the maximum diameter of the second inner shoulder.

5. The large-size rolling bearing according to claim 3 wherein the outer race of the first ball row has a first annular outer shoulder and a second annular outer shoulder that respectively delimit one of the inner surfaces for receiving the ball raceways of the first ball row, and
the outer race of the second ball row has a third annular outer shoulder and a fourth annular outer shoulder that respectively delimit one of the inner surfaces for receiving the ball raceways of the second ball row,
wherein a minimum diameter of the fourth outer shoulder is different from a minimum diameter of the first outer shoulder.

6. The large-size rolling bearing according to claim 5 wherein a minimum diameter of the third outer shoulder is different from a minimum diameter of the second outer shoulder.

7. The large-size rolling bearing according to claim 5 wherein a largest of maximum diameters of the first, second, third, and fourth inner shoulders is smaller than or equal to a smallest of minimum diameters of the first, second, third, and fourth outer shoulders.

8. The large-size rolling bearing according to claim 5 wherein the first ball row and the second ball row each have balls arranged along a first running circle diameter.

9. The large-size rolling bearing according to claim 8 wherein a largest of a maximum diameters of the inner shoulders is equal to or in a range of up to 0.5 mm below the first running circle diameter of the first and second ball rows.

10. The large-size rolling bearing according to claim 8 wherein the smallest of the minimum diameters of the outer shoulders is equal to or in a range of up to 0.5 mm above the first running circle diameter of the first and second ball rows.

11. The large-size rolling bearing according to claim 9 wherein the maximum diameter of the first inner shoulder is equal to the maximum diameter of the third inner shoulder and larger than the maximum diameter respectively of the second and fourth inner shoulders.

12. The large-size rolling bearing according to claim 5 wherein the minimum diameter of the second outer shoulder is equal to the minimum diameter of the fourth outer shoulder and smaller than the minimum diameter respectively of the first and third outer shoulders.

13. The large-size rolling bearing according to claim 1 wherein the balls of the first ball row are arranged along a first running circle diameter and the balls of the second ball row are arranged along a second running circle diameter which is different from the diameter of the first ball row.

14. The large-size rolling bearing according to claim 3 wherein a maximum diameter of the first inner shoulder is larger than a maximum diameter of the second inner shoulder and a maximum diameter of the third inner shoulder is larger than a maximum diameter of the fourth inner shoulder.

15. The large-size rolling bearing according to claim 5 wherein a minimum diameter of the fourth outer shoulder is smaller than a minimum diameter of the third outer shoulder and a minimum diameter of the second outer shoulder is smaller than a minimum diameter of the first outer shoulder.

16. The large-size rolling bearing according to claim 1 wherein the first ball row comprises balls of a first ball diameter and the second ball row comprises balls of a second ball diameter different from the first ball diameter.

17. The large-size rolling bearing according to claim 1 wherein the large-size rolling bearing has one or more further ball rows, wherein the one or more further ball rows are arranged in axially mutually spaced relationship respectively in a four-point bearing configuration, wherein respectively associated with a ball row are four raceway portions which respectively have a surface for receiving the ball raceway and wherein the respective surface of a raceway portion provided in the inner race is larger than the surface of the respectively adjacent raceway portion provided in the inner race and equal to the surface of the respectively diametrally opposite raceway portion provided in the outer race.

18. A wind power installation comprising:
a pylon having a pylon head, and
a pod adapted to receive a rotor, wherein the pod is mounted rotatably relative to the pylon by an azimuth bearing,
wherein the azimuth bearing is in the form of the large-size rolling bearing according to claim 1.

19. A rolling bearing comprising:
an outer race that includes first and second outer grooves, each groove having a first outer raceway portion and a second outer raceway portion;
an inner race that includes first and second inner grooves, each groove having a first inner raceway portion and a second inner raceway portion;
a first row of balls located between the first outer groove and the first inner groove and having a resting point of contact with the first and second outer raceway portions of the first outer groove and with the first and second inner raceway portions of the first inner groove; and
a second row of balls located between the second outer groove and the second inner groove and having a resting point of contact with the first and second outer raceway portions of the second outer groove and the first and second inner raceway portions of the second inner groove, wherein a surface area of the first inner raceway portion of the first groove is greater than a surface area of the second inner raceway portion of the first groove, and is equal to a surface area of the first outer raceway portion of the first groove.

20. The rolling bearing according to claim 19 wherein the balls of the first row of balls are arranged along a first running circle diameter and the balls of the second row of balls are arranged along a second running circle diameter, the first and second running circle diameter being greater than 300 mm.

* * * * *